(12) United States Patent
Ng (10) Patent No.: US 6,237,070 B1
(45) Date of Patent: *May 22, 2001

(54) METHOD AND SYSTEM FOR DETERMINING THE DATA LAYOUT GEOMETRY OF A DISK DRIVE

(75) Inventor: Spencer W. Ng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/126,745

(22) Filed: Jul. 31, 1998

(51) Int. Cl.$^7$ .................................................. G06F 12/00

(52) U.S. Cl. .............................. 711/167; 711/111; 710/5

(58) Field of Search ................................. 360/48, 78.04, 360/78.14, 54; 380/27; 711/100, 111, 112, 167, 168, 4; 710/5; 714/47

(56) References Cited

U.S. PATENT DOCUMENTS

| | | | |
|---|---|---|---|
| 4,935,825 | * 6/1990 | Worrell et al. | 360/54 |
| 5,636,075 | * 6/1997 | Nishimura et al. | 360/48 |
| 5,740,358 | * 4/1998 | Geldman et al. | 714/47 |
| 5,751,883 | * 5/1998 | Ottesen et al. | 386/27 |
| 5,784,220 | * 7/1998 | Nishimura et al. | 360/78.14 |
| 5,854,941 | * 12/1998 | Ballard et al. | 710/5 |
| 6,026,463 | * 2/2000 | Klein | 711/4 |

FOREIGN PATENT DOCUMENTS

| | | |
|---|---|---|
| 404146573A | * 5/1992 | (JP) . |
| 404146574A | * 5/1992 | (JP) . |

OTHER PUBLICATIONS

IBM Technical Disclosure Bulletin, Adaptive Skew Optimization, Oct. 1995, pp. 559–562.*

Worthington et al., "On–Line Extraction of SCSI Disk Drive Parameters", 1995, 146–156.*

Aboutabl et al., "Temporally Determinate Disk Access: An Experimental Approach", 1998.*

* cited by examiner

Primary Examiner—Matthew Kim
Assistant Examiner—Brian R. Peugh
(74) Attorney, Agent, or Firm—Morgan & Finnegan L.L.P.

(57) ABSTRACT

A system and method for determining the disk drive parameters of any disk drive that may be encountered. A novel access pattern is applied to the disk drive and a novel technique used to interpret the measured results. In order to determine a data layout geometry of a disk drive, access times for a plurality of sectors on the disk drive are measured by alternately performing the steps of: accessing an anchor sector of the disk drive, and accessing a successive sector of the disk drive and measuring a completion time of the access. Parameters related to the data layout geometry of the disk drive are determined based on the measured access times. Contiguous patterns of the measured access times are detected and gaps between contiguous patterns are detected. Gaps of a first size, representing a track skew, and gaps of a second size, representing a cylinder skew, are detected. A number of sectors per track is determined based on a contiguous pattern of access times between two track skew gaps, wherein the number of sectors per track is equal to the number of contiguous access times in the contiguous pattern. A number of tracks per cylinder, which is equal to a number of contiguous patterns of access times between two cylinder skew gaps, is determined. A gap of a third size, representing a revolution is detected and a revolution speed of the disk drive is determined based on the size of the revolution gap.

36 Claims, 7 Drawing Sheets

METHOD AND SYSTEM FOR DETERMINING THE DATA LAYOUT GEOMETRY OF A DISK DRIVE

FIELD OF THE INVENTION

The present invention relates to a method of determining the data layout geometry of a disk drive by applying a novel access pattern and interpretation of the measured results.

BACKGROUND OF THE INVENTION

Modern disk drives store data in blocks with a fixed size. The physical block in a drive are termed sectors. The sectors are arranged in tracks, each track having a fixed number of sectors, and the tracks are arranged in cylinders. Many of today's magnetic disk drives employ zone recording, where all tracks within a zone have the same number of sectors per track. The sectors may be skewed from track to track and from cylinder to cylinder.

These disk drive parameters, namely, a number of tracks per cylinder, number of zones, number of sectors per track in each zone, track skew, and cylinder skew, define the data layout geometry of a disk drive. These parameters affect the performance characteristics of a disk drive. An additional parameter that affects the disk drive performance is the drive's rotational speed. A need arises for a technique with which these disk drive parameters may be quickly and easily determined, for any disk drive encountered.

SUMMARY OF THE INVENTION

The present invention is a system and method for determining the disk drive parameters of any disk drive that may be encountered. By applying a special access pattern to the disk drive and a special technique of interpreting the measured results, the present invention can determine the number of data tracks per cylinder, the number of recording zones, number of sectors per track in each zone, the track skew, the cylinder skew, and the rotational speed of the disk drive.

In order to determine a data layout geometry of a disk drive, access times for a plurality of sectors on the disk drive are measured by alternately performing the steps of: accessing an anchor sector of the disk drive, and accessing a successive sector of the disk drive and measuring a completion time of the access. Parameters related to the data layout geometry of the disk drive are determined based on the measured access times.

In order to determine the parameters, contiguous patterns of the measured access times are detected and gaps between contiguous patterns of the measured access times are detected. Parameters related to the data layout geometry of the disk drive are then determined based on the detected contiguous patterns and gaps in the contiguous patterns of the measured access times.

Gaps of a first size, representing a track skew, and gaps of a second size, representing a cylinder skew, are detected. A number of sectors per track is determined based on a contiguous pattern of access times between two track skew gaps, wherein the number of sectors per track is equal to the number of contiguous access times in the contiguous pattern. A number of tracks per cylinder, which is equal to a number of contiguous patterns of access times between two cylinder skew gaps, is determined. A gap of a third size, representing a revolution is detected and a revolution speed of the disk drive is determined based on the size of the revolution gap.

In another embodiment of the present invention, a plurality of measurements are performed, each performance of a measurement performed using a different anchor sector. A number of sectors per track is determined for each performance of the measuring step, whereby a zone layout of the disk drive is determined. An anchor sector to be used for each performance of the measuring step may be selected from the set $\{0, M/X, 2M/X, 3M/X, \ldots, (X-1)M/X)\}$, wherein M is the maximum logical block address of the disk drive and X is a positive integer.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
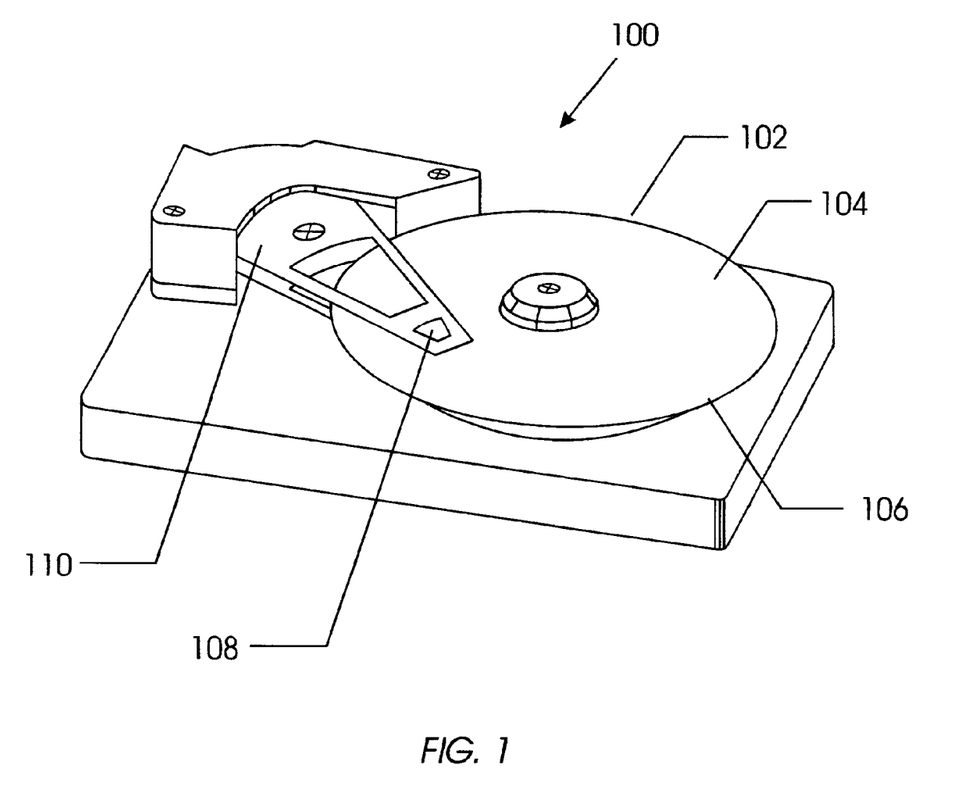
FIG. 1 shows a typical conventional disk drive.

A typical conventional disk drive 100 is shown in FIG. 1. Disk drive 100 includes at least one disk 102, upon which data is recorded. Disk 102 may be a rigid disk, as shown, or it may be a floppy disk. Data may be recorded magnetically, optically, or magneto-optically. There may be only one disk 102, as shown, or there may be a plurality of disks, typically arranged in a coaxial stack. Each disk 102 has two surfaces 104 and 106. On some disks, such as that shown, data may be recorded on both surfaces, while, on other disks, data may be recorded only on one surface. Data is written to, and read from, disk 102 by head 108, which includes a mechanism and circuitry appropriate for the recording technique used. There is at least one head for each surface on which data is recorded. Head 108 is moved across the surface of disk 102 by actuator 110. Typically, all heads are moved simultaneously by the actuator.

Figure 2:
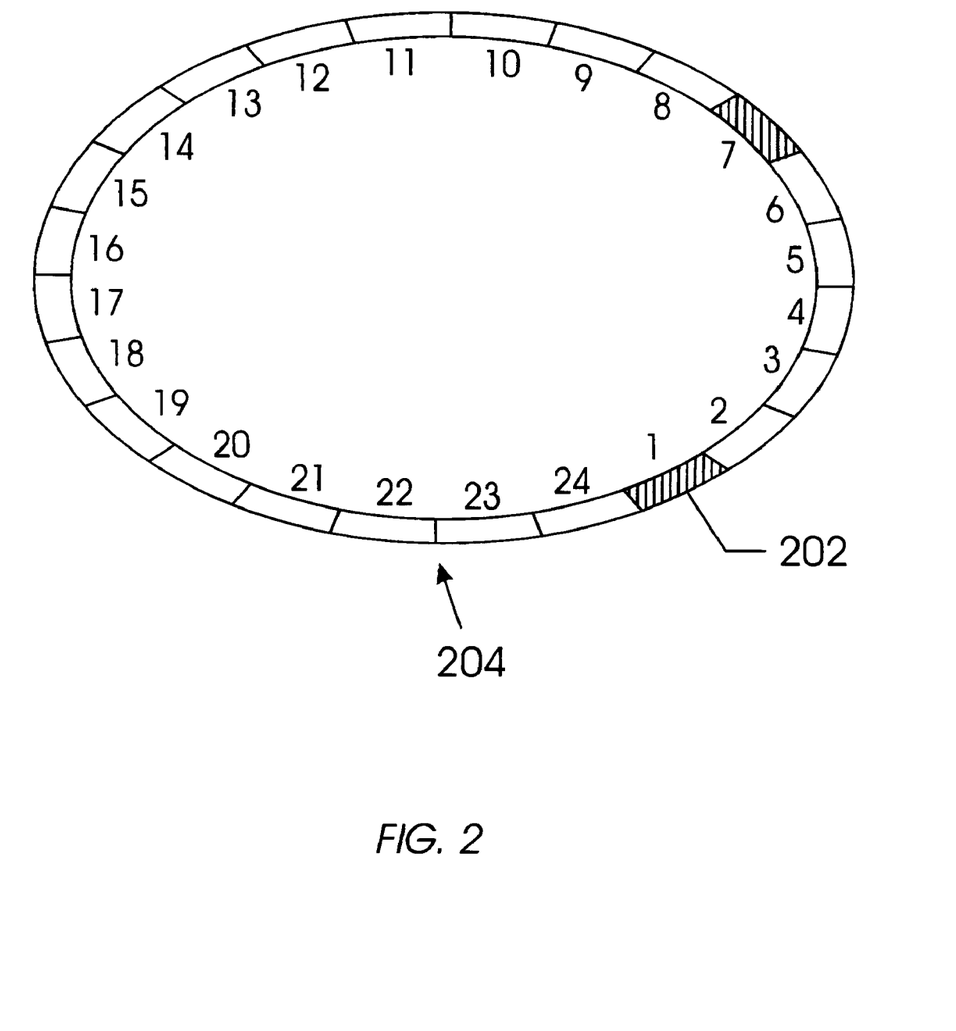
FIG. 2 shows a typical organization of data recorded on a track in the disk drive shown in FIG. 1.

The organization of data recorded on a disk drive, such as drive 100, is shown in FIG. 2. Typically, data is stored on a disk in fixed size blocks. The physical blocks on a disk are referred to as sectors, such as sector 202, shown in FIG. 2. The sectors that pass under a recording head during one revolution of the disk are called a track, such as track 204. Typically, physical sectors are mapped to logical sectors or block, and logical blocks are manipulated by the host computer system.

In a common data layout for magnetic disk drives, the first logical block (with a Logical Block Address or LBA of 1) is located on the first physical track (accessed by recording head 1) at the outermost diameter of the first recording surface. The next logical block 2 is physically the next sector that follows LBA 1. This continues until the end of the track is reached. In the example of FIG. 2 there are 24 sectors per track.

Figure 3:
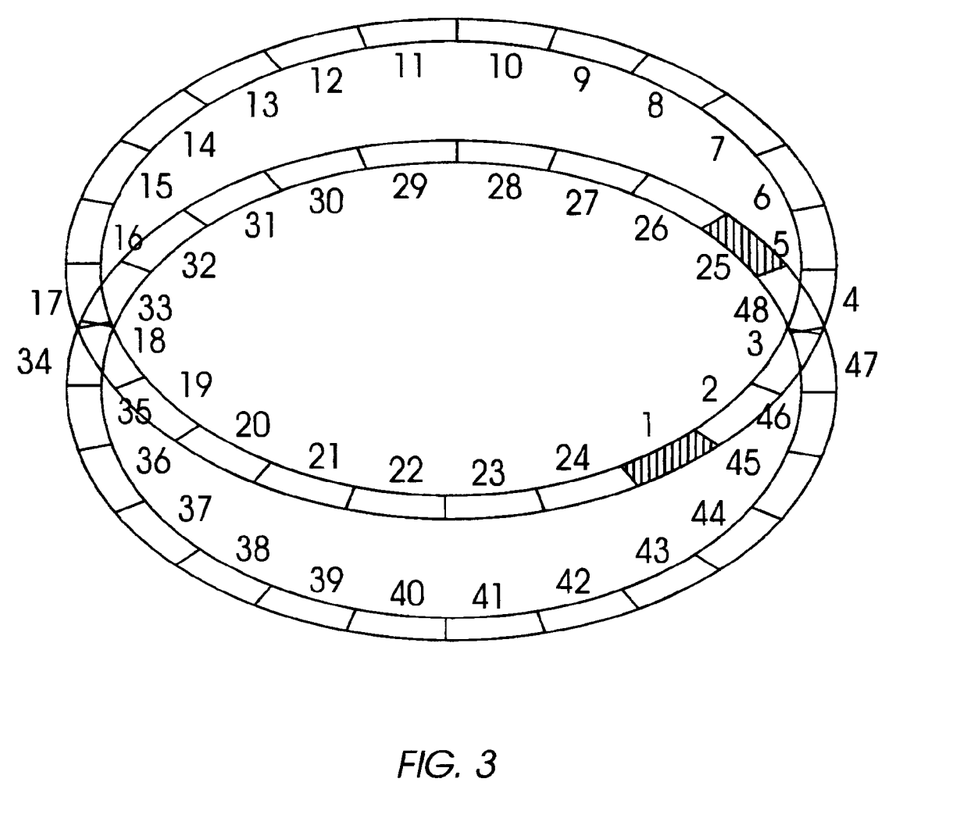
FIG. 3 shows a typical organization of data recorded on a cylinder in the disk drive shown in FIG. 1.

As shown in FIG. 3, the next logical block after the last block of track 1 is located on the first physical track at the outermost diameter of the next recording surface (accessed by recording head 2). Typically this first block of the second track is not located at the same relative angular position as the first block of the first track, but is offset by a small angular amount, as illustrated in FIG. 3. This offset is referred to as a track skew. The reason is to allow the disk drive time to switch from accessing data using recording head 1 to recording head 2, which takes a non-zero amount of time. This way, the drive can continuously access logically contiguous data without missing revolutions.

This data layout scheme continues until the last sector in the first track of the last recording surface is reached. The first track of each of the recording surface collectively form the first cylinder of the disk drive. The next logical block after the last sector of cylinder 1 is located on the second physical track of the first recording surface. Once again, this first sector is offset by a small angular amount from the first sector of the last track of the previous cylinder. This offset is referred to as a cylinder skew. The reason is the same as that for track skew. However, cylinder skew is typically larger than track skew because an actuator movement (a one cylinder seek) is involved.

Many of today's magnetic disk drives employ zone recording, where each recording surface is divided into concentric rings of recording areas or zones. The purpose is to increase the data storage efficiency of the disk drive. All the tracks within a zone have the same number of sectors per track. The outermost zone has the most number of sectors per track. As one moves from the outer—diameter of the disk towards the inner—diameter, the number of sectors per track decreases from zone to zone.

These disk drive parameters, namely, number of tracks per cylinder, number of zones, number of sectors per track in each zone, track skew, and cylinder skew, define the data layout geometry of a disk drive. These parameters affect the performance characteristics of a disk drive. The present invention determines these parameters by measuring certain performance characteristics of the disk drive.

Figure 4:
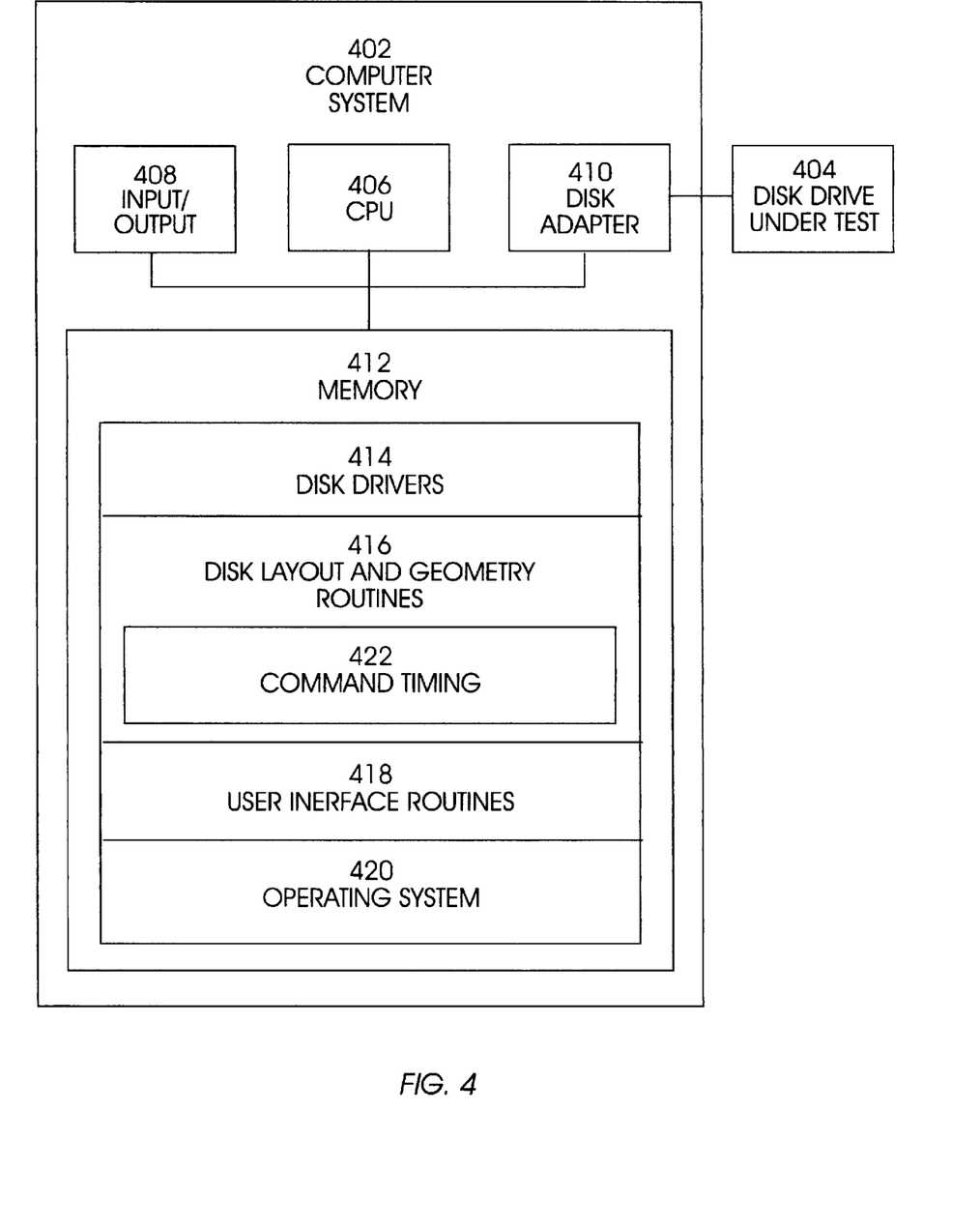
FIG. 4 is an exemplary block diagram of a system for determining the data layout geometry of a disk drive, according to the present invention.

A system 400 which determines the data layout geometry of a disk drive, according to the present invention, is shown in FIG. 4. System 400 includes computer system 402 and the disk drive 404, which is under test. Computer system 402 is typically a personal computer or workstation, but may be a minicomputer or mainframe computer. Computer system 402 includes processor (CPU) 406, input/output circuitry 408, disk drive adapter 410, and memory 412. CPU 406 executes program instructions in order to carry out the functions of the present invention. Typically, CPU 406 is a microprocessor, such as an INTEL PENTIUM® processor, but may also be a minicomputer or mainframe computer processor. Input/output circuitry 408 provides the capability to input data to, or output data from, computer system 402. For example, input/output circuitry may include input devices, such as keyboards, mice, touchpads, trackballs, scanners, etc., output devices, such as video adapters, monitors, printers, etc., and input/output devices, such as, modems, network adapters, etc. Disk adapter 410 provides computer system 402 with the capability to read, write and control disk drive 404. Typically, disk adapter 410 is an integrated drive electronics (IDE) based device, or a variation or enhancement thereof, such as enhanced IDE (EIDE) or ultra direct memory access (UDMA), or a small computer system interface (SCSI) based device, or a variation or enhancement thereof, such as fast-SCSI, wide-SCSI, fast and wide-SCSI, etc., or a fiber channel-arbitrated loop (FC-AL) device.

Memory 412 stores program instructions that are executed by, and data that is used by, CPU 406 to perform the functions of the present invention. Memory 412 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc. Memory 412 includes a plurality of blocks of program instructions, such as disk drivers 414, disk layout and geometry routines 416, user interface routines 418, and operating system 420. Disk drivers 414 provide a software interface between software and the hardware, such as disk adapter 410 and disk drive 404. Disk layout and geometry routines 416 perform a determination of the data layout of disk drive 404, according to the present invention. Disk layout and geometry routines 416 include command timing routine 422, which determines the elapsed time from when an I/O command is issued to disk drive 404 to when the command is completed. Typically, this timing is done by observing the system clock at the time the command is issued and again when the computer receives command complete indication. Alternatively, a hardware command timer may be provided instead.

User interface routines 418 provide interface between software and the user, such as keyboard input and screen output. Operating system 420 provides overall system functionality.

Disk drive 404 is typically a separate disk drive that is connected to computer system 402 for the purpose of determining the data layout geometry of disk drive 404. However, since memory 412 may include a disk drive, the data layout geometry of that disk drive may likewise be determined with the present invention. Thus, the present invention may be used to determine the data layout geometry of any disk drive connected to computer system 402, whether internal or external, and whether or not the disk drive contains data and/or program instructions used by computer system 402.

Figure 5:
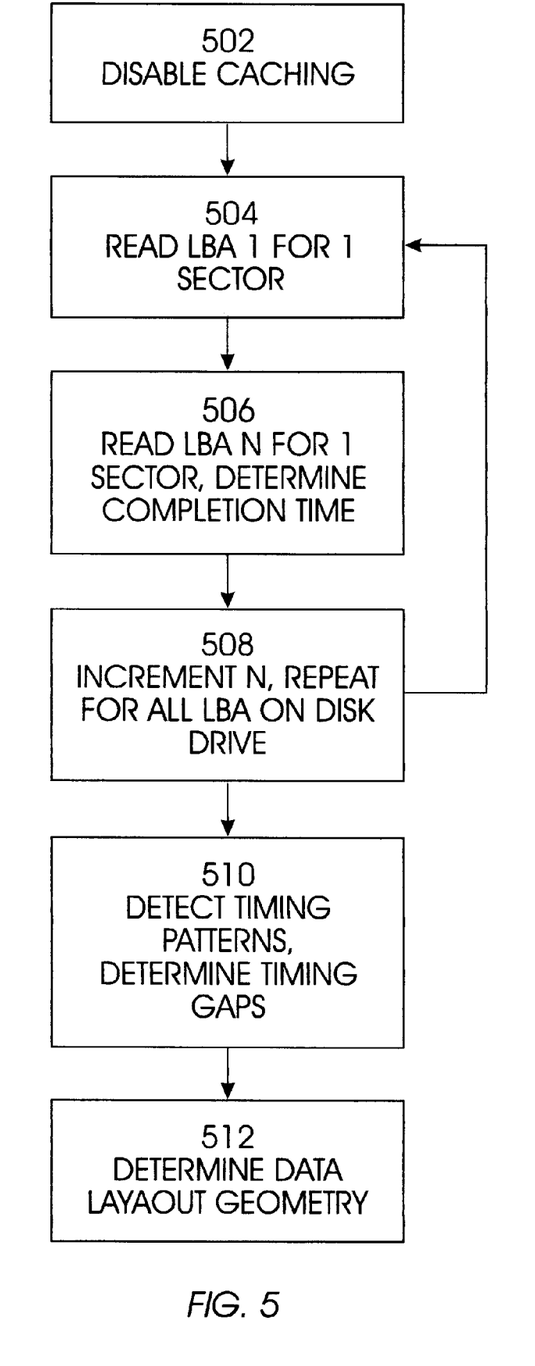
FIG. 5 is a flow diagram of a process for determining the data layout geometry of a disk drive, according to the present invention.

A process 500, for determining the data layout geometry of a disk drive, according to the present invention, is shown in FIG. 5. FIG. 5 is best viewed in conjunction with FIG. 6. The process begins with step 502, in which the appropriate caching is disabled or bypassed. Any system caching in the computer must be bypassed. Depending on whether the read command or the write command is used in the remaining steps, the read cache or the write cache in the disk drive is disabled.

In step 504, the process enters a loop including steps 504–508. In step 504, the computer system reads (or writes) the "anchor" sector for one sector, which in this example is LBA 1. In step 506, the computer system read LBA N for one sector and determines the completion time for the operation. Initially, N equals 1. In step 508, N is incremented and steps 504–508 are repeated for all logical blocks on the disk drive, if the entire disk drive is to be mapped. Thus, the process alternately performs the steps of reading LBA 1 and reading each successive sector (LBA N). Of course, if only a portion of the disk drive is to be mapped, only those sectors included in the portion to be mapped are read.

For example, if there are M logical blocks on the disk drive, the sequence of read operations is:
Read LBA 1 for 1 sector
Read LBA 1 for 1 sector
Read LBA 1 for 1 sector
Read LBA 2 for 1 sector
Read LBA 1 for 1 sector
Read LBA 3 for 1 sector
Read LBA 1 for 1 sector
Read LBA 4 for 1 sector
. . .
. . .
. . .
Read LBA 1 for 1 sector
Read LBA M for 1 sector In other words, the pattern is " . . . , Read LBA 1, Read LBA N, Read LBA 1, Read LBA N+1, . . . ". The purpose of the "Read LBA 1" is to re-orient the recording head to a fixed known starting position. This sector is termed the "anchor sector" of the sequence. Each command is issued to the disk drive by the computer system, which waits for its completion before the next command is issued. In other words, no command is queued in the disk drive. The computer issues the next command without any delay as soon as the current command is completed. The command completion time of each "Read LBA N" is timed, as described above. The completion time of the re-orient command "Read LBA 1" is immaterial.

Figure 6:
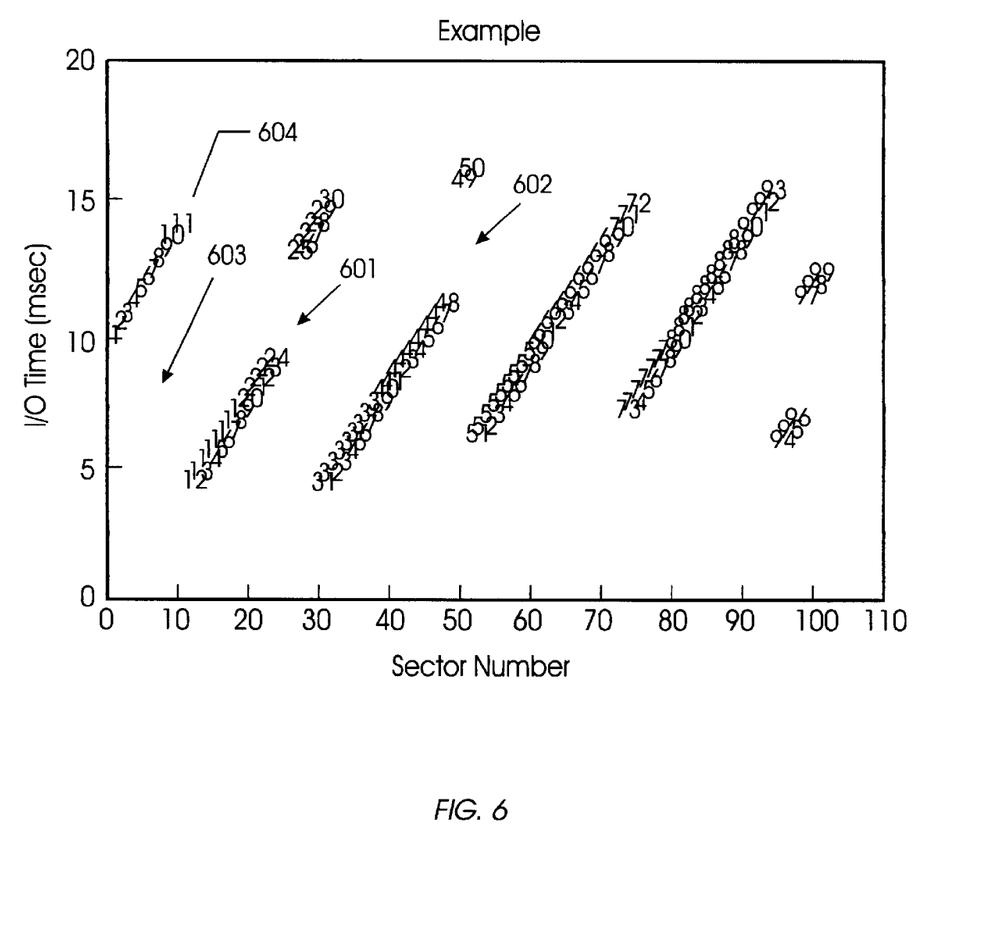
FIG. 6 is a plot of sector access times, showing the access time patterns that are used by the process shown in FIG. 5.

In step 510, the patterns in the measured timings are detected and the gaps in those patterns are determined. An exemplary timing pattern, for a disk drive having the data layout geometry shown in FIG. 3, is shown in FIG. 6. For ease of identification, the LBA number of each point is used to mark the coordinates. As shown, the access completion times for successive LBA's forms a plurality of contiguous patterns, each contiguous pattern representing a group of LBA's. There are timing gaps between the LBA groups, which separate the groups. The first gap 601, which occurs between successive LBA's 24 and 25, is the track skew. The second gap 602, which occurs between successive LBA's 48 and 49, is either a track skew or a cylinder skew. Since this gap is substantially larger than the track skew 601, gap 602 is a cylinder skew. Gap 603, which is typically the largest gap, represents approximately one revolution of the disk, and is termed a revolution gap.

In step 512, the data layout geometry is determined. All the sectors occurring between any two gaps represent a track. Thus, the number of sectors in a group between any two gaps represent the number of sectors in that track. In FIG. 6, there are 24 sectors prior to gap 601, and there are 24 sectors between gap 601 and 602, therefore, there are 24 sectors in a track (in agreement with FIG. 3).

The number of tracks that occur before the first cylinder skew is encountered, or between two cylinder skew gaps, represent the number of tracks per cylinder. In this example, there are 2 tracks per cylinder.

The size of gap 603, the revolution gap, which is the distance between point 604, the maximum time required to access a sector in the a track, and point 605, the minimum time required to access a sector in the same track, roughly represents the time of one revolution of the disk. Dividing this number into 60 seconds will give an approximate estimation of the RPM of the disk drive. In the example shown in FIG. 6, time 604 is approximately 14.5 ms and time 605 is approximately 4.5 ms, with a difference of 10 ms. This yields a rotational speed of 60/0.010≈6000 RPM.

By performing steps 504–508 for every LBA in the disk drive, the geometry of all the tracks in the drive can be determined. This would clearly reveal all the zones in the drive as each zone has a distinct number of sectors per track.

Figure 7:
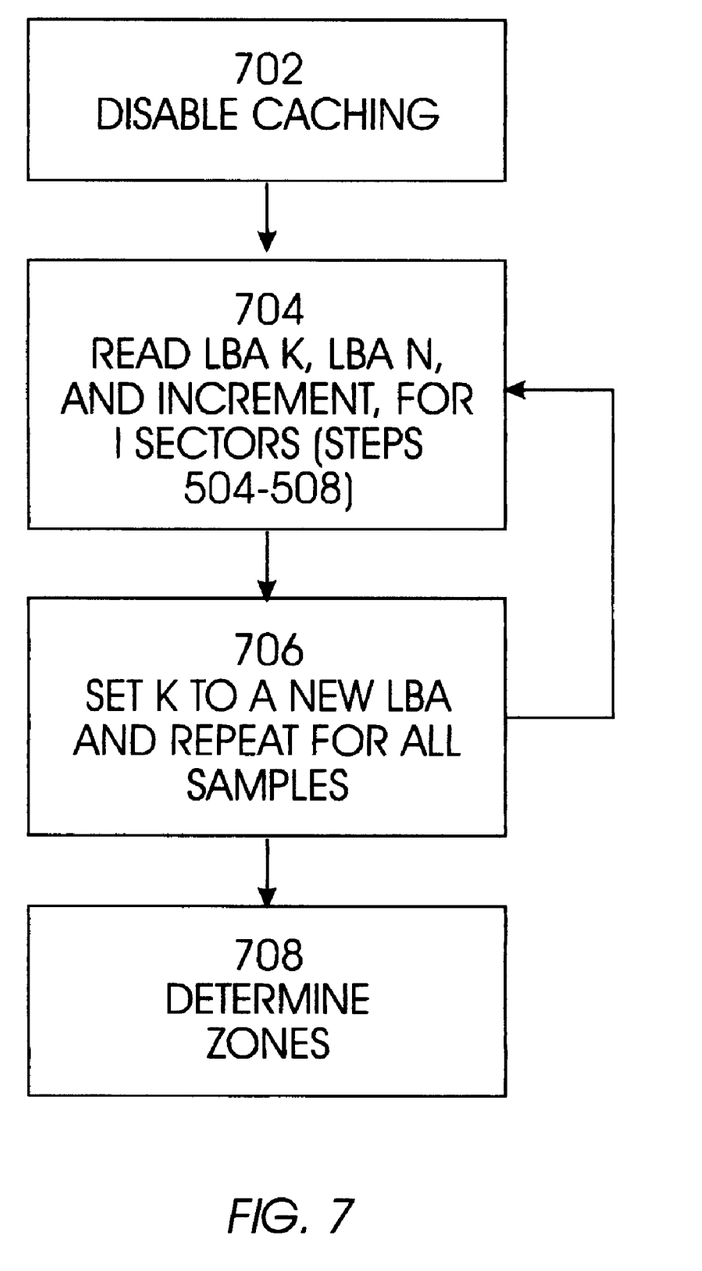
FIG. 7 is a flow diagram of an alternative process for determining the zoning information of a disk drive, according to the present invention.

The process 500, for every LBA in the disk drive, will take a very long time to complete. An alternative method of determining the zoning information of a drive is shown in FIG. 7. Essentially, the disk drive is sampled, using steps 504–508 of FIG. 5, at a plurality of anchor sectors throughout the drive. Process 700 begins with step 702, in which caching is disabled, as in step 502 of FIG. 5. In step 704, steps 504–508 are performed for I sectors, with an anchor sector of K. The sequence is as follows:

Read LBA K for 1 sector
Read LBA K for 1 sector
Read LBA K for 1 sector
Read LBA K+1 for 1 sector
Read LBA K for 1 sector
Read LBA K+2 for 1 sector
Read LBA K for 1 sector
Read LBA K+3 for 1 sector
Read LBA K for 1 sector
Read LBA K+4 for 1 sector
. . .
. . .
. . .
Read LBA K for 1 sector
Read LBA K+(I−1) for 1 sector Thus, a total of I sectors are read using LBA K as the anchor sector. Initially, K=1, so the anchor sector is LBA 1.

In step 706, K is set to a new LBA value and step 704 is repeated using the new anchor sector. Steps 704–706 are repeated for all sample anchor sectors on the disk drive. Sampling is accomplishing by selecting LBA K to be at various parts of the disk drive. In other words, K is selected from the set {0, M/X, 2M/X, 3M/X, . . . , (X−1)M/X)}, where M is the maximum LBA of the entire drive and X is a positive integer selected so as to ensure detection of all zones on the drive. For example, a typical set of values for K would be the set {0, M/100, 2M/100, 3M/100, . . . , 99M/100}.

In step 708, the zone layout of the disk drive is determined by determining the number of sectors per track for each sample value of K.

Although processes 500 and 700 are described as using read operations to determine access times, either type of access, read or write, may be used. Thus, alternative embodiments of the processes use write operations, or combinations of read and write operations. Read operations are preferred as they do not alter the data recorded on the disk drive, but where the data may be altered, write operations may be used.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of determining a data layout geometry of a portion to be mapped of a disk drive, comprising the steps of:

measuring access times for a totality of sectors within the portion of the disk drive by alternately performing the steps of:

accessing an anchor sector of the portion of the disk drive, and       accessing a successive sector of the portion of the disk drive and measuring a completion time of the access; and determining parameters related to the data layout geometry of the portion of the disk drive based on the measured access times, wherein said parameters include a number of tracks per cylinder, a number of zones, a number of sectors per track in each zone, track skew, cylinder skew, and a disk drive's rotational speed.

2. The method of claim 1, wherein the anchor sector is logical block address 1.

3. The method of claim 1, wherein the portion is the entire disk drive.

4. The method of claim 1, wherein the determining step comprises the steps of:

detecting contiguous patterns of the measured access times;

detecting gaps between contiguous patterns of the measured access times; and determining parameters related to the data layout geometry of the portion of the disk drive based on the detected contiguous patterns and gaps in the contiguous patterns of the measured access times.

5. The method of claim 4, wherein the gap detecting step comprises the steps of:

detecting first gaps, representing a track skew; and detecting second gaps, representing a cylinder skew, wherein the first gaps are of a closely proximate range in size and the second gaps are of a closely proximate range of a different size.

6. The method of claim 5, wherein the step of determining parameters based on detected patterns and gaps comprises the steps of:

determining a number of sectors per track based on a contiguous pattern of access times between two track skew gaps, wherein the number of sectors per track is equal to the number of contiguous access times in the contiguous pattern; and determining a number of tracks per cylinder equal to a number of contiguous patterns of access times between two cylinder skew gaps.

7. The method of claim 5, wherein the gap detecting step further comprises the steps of:

detecting a third gap, representing a revolution; and determining a revolution speed of the disk drive based on the size of the revolution gap.

8. The method of claim 1, further comprising the steps of:

performing a plurality of said measuring steps, each performance of the measuring step is performed using a different anchor sector; and wherein the determining step comprises the step of determining a number of sectors per track for each performance of the measuring step, whereby a zone layout of the portion of the disk drive is determined.

9. The method of claim 8, wherein the performing step further comprises the step of:

selecting an anchor sector to be used for each performance of the measuring step from the set {0, M/X, 2M/X, 3M/X, . . . , (X−1)M/X)}, wherein M is the maximum logical block address of the disk drive and X is a positive integer.

10. A system for determining a data layout geometry of a portion to be mapped of a disk drive, comprising:

a processor;

a disk drive adapter coupling the processor to the disk drive; and a memory containing program instructions, executable by the processor to perform the steps of:

measuring access times for a totality of sectors within the portion of the disk drive by alternately performing the steps of:

accessing an anchor sector of the portion of the disk drive, and accessing a successive sector of the portion of the disk drive and measuring a completion time of the access; and determining parameters related to the data layout geometry of the portion of the disk drive based on the measured access times, wherein said parameters include a number of tracks per cylinder, a number of zones, a number of sectors per track in each zone, track skew, cylinder skew, and a disk drive's rotational speed.

11. The system of claim 10, wherein the anchor sector is logical block address 1.

12. The system of claim 10, wherein the portion is the entire disk drive.

13. The system of claim 10, wherein the program instructions for performing the determining step comprise program instructions for performing the steps of:

detecting contiguous patterns of the measured access times;

detecting gaps between contiguous patterns of the measured access times; and determining parameters related to the data layout geometry of the portion of the disk drive based on the detected contiguous patterns and gaps in the contiguous patterns of the measured access times.

14. The system of claim 13, wherein the program instructions for performing the gap detecting comprise program instructions for performing the steps of:

detecting first gaps, representing a track skew; and detecting second gaps, representing a cylinder skew, wherein the first gaps are of a closely proximate range in size and the second gaps are of a closely proximate range of a different size.

15. The system of claim 14, wherein the program instructions for performing the step of determining parameters based on detected patterns and gaps comprise program instructions for performing the steps of:

determining a number of sectors per track based on a contiguous pattern of access times between two track skew gaps, wherein the number of sectors per track is equal to the number of contiguous access times in the contiguous pattern; and determining a number of tracks per cylinder equal to a number of contiguous patterns of access times between two cylinder skew gaps.

16. The system of claim 14, wherein the program instructions for performing the gap detecting step further comprise program instructions for performing the steps of:

detecting a third gap, representing a revolution; and determining a revolution speed of the disk drive based on the size of the revolution gap.

17. The system of claim 10, wherein the memory further contains program instructions for performing the steps of:

performing a plurality of said measuring steps, each performance of the measuring step is performed using a different anchor sector; and wherein the determining step comprises the step of determining a number of sectors per track for each performance of the measuring step, whereby a zone layout of the disk drive is determined.

18. The system of claim 17, wherein the program instructions for performing the performing step further comprise program instructions for performing the steps of:
  selecting an anchor sector to be used for each performance of the measuring step from the set $\{0, M/X, 2M/X, 3M/X, \ldots, (X-1)M/X)\}$, wherein M is the maximum logical block address of the disk drive and X is a positive integer.

19. A computer program product for determining a data layout geometry of a portion to be mapped of a disk drive, comprising:
  a computer readable medium;
  computer program instructions, recorded on the computer readable medium, executable by a processor coupled to the disk drive, for performing the steps of:
    accessing an anchor sector of the portion of the disk drive, and
    accessing a successive sector of the portion of the disk drive and
    measuring a completion time of the access; and
  determining parameters related to the data layout geometry of the portion of the disk drive based on the measured access times, wherein said parameters include a number of tracks per cylinder, a number of zones, a number of sectors per track in each zone, track skew, cylinder skew, and a disk drive's rotational speed.

20. The computer program product of claim 19, wherein the anchor sector is logical block address 1.

21. The computer program product of claim 19, wherein the portion is the entire disk drive.

22. The computer program product of claim 19, wherein the computer program instructions for performing the determining step comprise program instructions for performing the steps of:
  detecting contiguous patterns of the measured access times;
  detecting gaps between contiguous patterns of the measured access times; and
  determining parameters related to the data layout geometry of the portion of the disk drive based on the detected contiguous patterns and gaps in the contiguous patterns of the measured access times.

23. The computer program product of claim 22, wherein the computer instructions for performing the gap detecting comprise computer program instructions for performing the steps of:
  detecting first gaps, representing a track skew; and
  detecting second gaps, representing a cylinder skew, wherein the first gaps are of a closely proximate range in size and the second gaps are of a closely proximate range of a different size.

24. The computer program product of claim 23, wherein the computer program instructions for performing the step of determining parameters based on detected patterns and gaps comprise computer program instructions for performing the steps of:
  determining a number of sectors per track based on a contiguous pattern of access times between two track skew gaps, wherein the number of sectors per track is equal to the number of contiguous access times in the contiguous pattern; and
  determining a number of tracks per cylinder equal to a number of contiguous patterns of access times between two cylinder skew gaps.

25. The computer program product of claim 23, wherein the computer program instructions for performing the gap detecting step further comprise computer program instructions for performing the steps of:
  detecting a third gap, representing a revolution; and
  determining a revolution speed of the disk drive based on the size of the revolution gap.

26. The computer program product of claim 19, further containing computer program instructions for performing the steps of:
  performing a plurality of said measuring steps, each performance of the measuring step is performed using a different anchor sector; and
  wherein the determining step comprises the step of determining a number of sectors per track for each performance of the measuring step, whereby a zone layout of the disk drive is determined.

27. The computer program product of claim 26, wherein the computer program instructions for performing the performing step further comprise computer program instructions for performing the steps of:
  selecting an anchor sector to be used for each performance of the measuring step from the set $\{0, M/X, 2M/X, 3M/X, \ldots, (X-1)M/X)\}$, wherein M is the maximum logical block address of the disk drive and X is a positive integer.

28. A system for determining a data layout geometry of a portion to be mapped of a disk drive, comprising:
  means for measuring access times for a totality of sectors within the portion of the disk drive by alternately:
    accessing an anchor sector of the portion of the disk drive, and
    accessing a successive sector of the portion of the disk drive and
    measuring a completion time of the access; and
  means for determining parameters related to the data layout geometry of the portion of the disk drive based on the measured access times, wherein said parameters include a number of tracks per cylinder, a number of zones, a number of sectors per track in each zone, track skew, cylinder skew, and a disk drive's rotational speed.

29. The system of claim 28, wherein the anchor sector is logical block address 1.

30. The system of claim 28, wherein is the entire disk drive.

31. The system of claim 28, wherein the determining means comprises:
  means for detecting contiguous patterns of the measured access times;
  means for detecting gaps between contiguous patterns of the measured access times; and
  means for determining parameters related to the data layout geometry of the portion of the disk drive based on the detected contiguous patterns and gaps in the contiguous patterns of the measured access times.

32. The system of claim 31, wherein the gap detecting means comprises:
  means for detecting first gaps, representing a track skew; and
  means for detecting second gaps, representing a cylinder skew, wherein the first gaps are of a closely proximate range in size and the second gaps are of a closely proximate range of a different size.

33. The system of claim 32, wherein the gap detecting means further comprises:

means for detecting a third gap, representing a revolution; and means for determining a revolution speed of the disk drive based on the size of the revolution gap.

34. The system of claim 32, wherein the gap detecting means further comprises:

means for detecting a gap of a third size, representing a revolution; and means for determining a revolution speed of the disk drive based on the size of the revolution gap.

35. The system of claim 28, further comprising:

means for repetitively operating the measuring means, each operation of the measuring means using a different anchor sector; and wherein the determining means comprises the means for determining a number of sectors per track for each performance of the measuring step, and means for determining a zone layout of the disk drive therefrom.

36. The system of claim 35, wherein the performing means further comprises:

means for selecting an anchor sector to be used for each performance of the measuring step from the set $\{0, M/X, 2M/X, 3MX, \ldots, (X-1)M/X)\}$, wherein M is the maximum logical block address of the disk drive and X is a positive integer.

* * * * *